Patented May 25, 1926.

1,586,008

UNITED STATES PATENT OFFICE.

MANUEL A. SEVILLA, OF LOS ANGELES, CALIFORNIA.

GLASS-CLEANING COMPOSITION.

No Drawing. Application filed May 14, 1924. Serial No. 713,221.

My invention relates to a glass cleaning composition and has for its object to compound a composition, which is inexpensive and easily applied, and will quickly and thoroughly clean glass and enamel surfaces.

My invention consists in the composition of matter hereinafter described and claimed.

The composition is made up as follows:

1 part powdered pumice stone; 2 parts whiting, 1 part alcohol; 15 parts water, the proportions being by weight.

The composition is thoroughly shaken up before using, and is applied a few drops at a time on the glass or enamel surface to be polished, and immediately rubbed with tissue paper or cloth until the surface is cleaned and polished.

The alcohol serves to cut the grease, while the pumice stone will cut and remove dirt and grease, and the whiting will polish and remove the dirt and grease loosened by the alcohol and pumice stone. The whiting appears to modify the cutting action of the pumice stone, and if the rubbing is done not too vigorously it will be found that the pumice does not cut or scratch the surface to be polished.

It will be understood that I do not limit myself to the exact proportions of the ingredients given, but the same may be varied within wide limits and still produce a useful glass cleaning composition.

I claim:

A glass cleaning composition in the form of a liquid consisting of the following ingredients in the proportions stated;—powdered pumice stone 1 part; whiting 2 parts; alcohol 1 part; water 15 parts.

In testimony whereof I have signed my name to this specification.

MANUEL A. SEVILLA.